(No Model.)
H. J. SEYMOUR.
ANIMAL TRAP.
No. 344,994. Patented July 6, 1886.
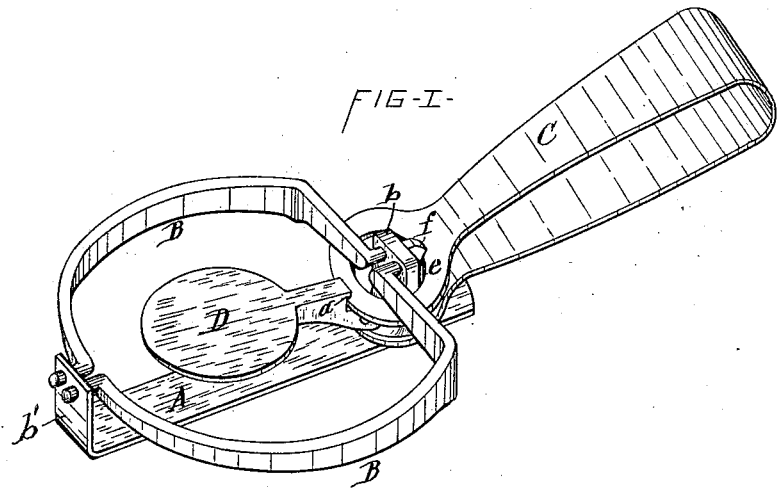
Fig-I-
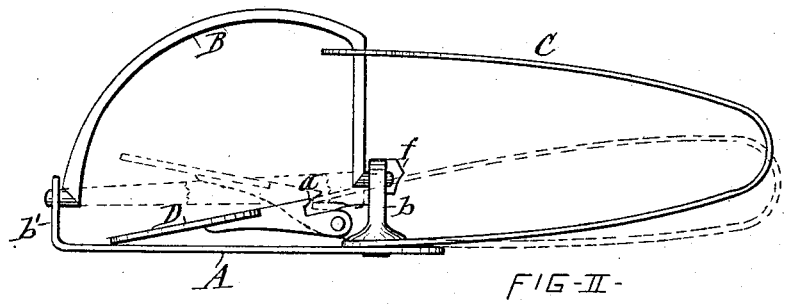
Fig-II-
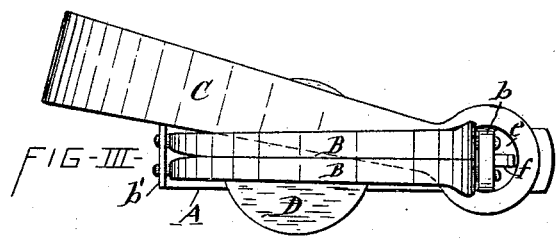
Fig-III-
WITNESSES
C. Bendixon
A. F. Walz
INVENTOR
Henry J. Seymour

UNITED STATES PATENT OFFICE.

HENRY J. SEYMOUR, OF COMMUNITY, NEW YORK.

ANIMAL-TRAP.

SPECIFICATION forming part of Letters Patent No. 344,994, dated July 6, 1886.

Application filed February 19, 1886. Serial No. 192,480. (No model.)

*To all whom it may concern:*

Be it known that I, HENRY J. SEYMOUR, of Community, in the county of Madison, in the State of New York, have invented new and useful Improvements in Animal-Traps, of which the following, taken in connection with the accompanying drawings, is a full, clear, and exact description.

This invention relates to the class of animal-traps in which spring-actuated jaws are pivoted on posts rising from the base of the trap, and the bait-pan is arranged centrally between the pivoted ends of the jaws, and by means of a latch engaging one of the jaws and the bait-pan the trap is held in its set position.

The object of my invention is to simplify and cheapen the construction of said trap, and to render the same more convenient in the operation of setting it; and to that end my invention consists in the improved construction and combination of parts hereinafter fully described, and specifically set forth in the claim.

In the annexed drawings, Figure I is a perspective view showing my improved trap in its set position. Fig. II is a side view of the same, showing the trap in its aforesaid position by dotted lines, and in its sprung position by full lines; and Fig. III is a top view showing the trap in its folded position.

Similar letters of reference indicate corresponding parts.

A denotes the frame or base of the trap. From said frame rise two posts, $b$ $b'$, on which are pivoted the jaws B B, in the usual manner; and C represents the bowed spring, connected at one end to the base of the post $b$, and provided at the opposite end with an eye, $e$, by which it embraces the ends of the two jaws directly above the post $b$.

D represents the bait-pan, which hitherto has been pivoted on an arm projecting from the frame A at right angles to the jaws, and a latch pivoted on said arm at the outside of the heel or pivoted end of the bait-pan was made to engage the latter, and also the jaw which lies back of the heel of the bait-pan when in their set position. Such traps, however, are expensive to manufacture, owing to the attachment of the aforesaid extra laterally-projecting arm and the extra latch which is pivoted on said arm.

Said traps are also dangerous to manipulate in the operation of setting the same, and are liable to throw the animal's foot out from the trap by the upward thrust of the said jaw, and, furthermore, such traps cannot be folded compactly for transportation or storage. All of these defects I obviate by my present invention, in which I dispense with the extra laterally-projecting arm and the extra latch pivoted thereon, and thereby allow the spring to be swung around by the side of the jaws, and thus the trap to be folded compactly, as represented in Fig. III of the drawings.

I pivot the bait-pan on the inner side of the same post, $b$, on which are pivoted the ends of the jaws, which are embraced by the spring C, and provide the heel or hinged end of the bait-pan with a shoulder, $a$, projecting toward the post $b$, so as to engage the top of the spring C when depressed and in its set position, as represented in Fig. I of the drawings, and by dotted lines in Fig. II of the drawings. The aforesaid engagement of the bait-pan with the spring holds the trap in its set position. A slight depression of the bait-pan releases the spring from the shoulder $a$, and thus the trap is sprung.

My improved trap is set very conveniently and without much danger of catching the operator's fingers between the jaws of the trap, the setting being accomplished by compressing the spring sufficiently to allow the jaws to drop into their open position; then, by placing the operator's hand under the trap and holding the jaws by the fingers and inverting the trap, the bait-pan drops by its gravity, to allow the shoulder $a$ thereof to engage the spring. The rear or outer side of the post $b$, I provide with a cam-lug, $f$, which enters the eye $e$ of the spring when compressed, and serves to crowd the spring rearward and to steady the same so as to insure its engagement with the shoulder $a$ on the heel of the bait-pan. The engagement of said lug $f$ with the spring C also forms a partial lock, which guards against accidental release of the spring from the bait-pan.

Having described my invention, what I claim as new, and desire to secure by Letters Patent, is—

In combination with the frame A, posts $b$ $b'$, jaws B B, pivoted on said posts, and the spring C, having the eye $e$, embracing the ends of the jaws directly above the post $b$, the bait-pan D, pivoted on the inner side of said post and provided with the shoulder $a$, adapted to engage the spring, and the cam-lug $f$, attached to the outer side of the post $b$, substantially as described and shown, for the purpose set forth.

In testimony whereof I have hereunto signed my name and affixed my seal, in the presence of two attesting witnesses, at Syracuse, in the county of Onondaga, in the State of New York, this 13th day of February, 1886.

HENRY J. SEYMOUR. [L. S.]

Witnesses:
    C. BENDIXON,
    C. H. DUELL.